US010230117B2

(12) United States Patent
Andreas-Schott

(10) Patent No.: US 10,230,117 B2
(45) Date of Patent: Mar. 12, 2019

(54) BIPOLAR PLATE, FUEL CELL HAVING SUCH A PLATE AND MOTOR VEHICLE HAVING SUCH A FUEL CELL

(71) Applicant: Volkswagen AG, Wolfsburg (DE)

(72) Inventor: Benno Andreas-Schott, Sassenburg / OT Triangel (DE)

(73) Assignee: Volkswagen AG, Wolfsburg (DE)

( * ) Notice: Subject to any disclaimer, the term of this patent is extended or adjusted under 35 U.S.C. 154(b) by 425 days.

(21) Appl. No.: 14/895,430

(22) PCT Filed: Apr. 15, 2014

(86) PCT No.: PCT/EP2014/057638
§ 371 (c)(1),
(2) Date: Dec. 2, 2015

(87) PCT Pub. No.: WO2014/195052
PCT Pub. Date: Dec. 11, 2014

(65) Prior Publication Data
US 2016/0118673 A1    Apr. 28, 2016

(30) Foreign Application Priority Data
Jun. 6, 2013 (DE) .................. 10 2013 210 542

(51) Int. Cl.
*H01M 8/026* (2016.01)
*H01M 8/0258* (2016.01)
(Continued)

(52) U.S. Cl.
CPC ....... *H01M 8/04225* (2016.02); *H01M 8/026* (2013.01); *H01M 8/0258* (2013.01);
(Continued)

(58) Field of Classification Search
CPC .. H01M 8/0258; H01M 8/026; H01M 8/0267; H01M 8/04225; H01M 8/1004;
(Continued)

(56) References Cited

U.S. PATENT DOCUMENTS

2006/0127706 A1   6/2006  Goebel et al.
2007/0202383 A1   8/2007  Goebel
(Continued)

FOREIGN PATENT DOCUMENTS

| DE | 10 2006 047174 A1 | 5/2007 |
|---|---|---|
| DE | 10 2007 008 214 A1 | 8/2007 |
| DE | 11 2005 003 103 T5 | 10/2007 |
| DE | 11 2005 003 052 T5 | 12/2007 |
| DE | 103 94 231 B4 | 8/2009 |
| DE | 10 2009 020224 A1 | 12/2009 |
| DE | 10 2008 056 900 A1 | 5/2010 |

(Continued)

*Primary Examiner* — Sarah A. Slifka
*Assistant Examiner* — Lilia Nedialkova
(74) *Attorney, Agent, or Firm* — Muncy, Geissler, Olds & Lowe, P.C.

(57) ABSTRACT

A bipolar plate for a fuel cell, having an anode side and a cathode side. The bipolar plate has two inactive supply regions, having anode gas channels which are each connected to one of two anode gas main channels and an anode gas flow field of an active region; cathode gas channels which are each connected to one of two cathode gas main channels and a cathode gas flow field of the active region; and coolant channels which are each connected to one of two coolant main channels and a coolant flow field of the active region. At least one of the anode gas main channels and the anode gas channels of the supply region connected thereto are arranged so that a length difference between a longest and a shortest anode gas channel of this supply region is at most 50% of the length of the longest anode gas channel.

10 Claims, 7 Drawing Sheets

(51) Int. Cl.
*H01M 8/241* (2016.01)
*H01M 8/0267* (2016.01)
*H01M 8/1004* (2016.01)
*H01M 8/04225* (2016.01)
*H01M 8/1018* (2016.01)

(52) U.S. Cl.
CPC ....... *H01M 8/0267* (2013.01); *H01M 8/1004* (2013.01); *H01M 8/241* (2013.01); *H01M 2008/1095* (2013.01); *H01M 2250/20* (2013.01); *Y02T 90/32* (2013.01)

(58) Field of Classification Search
CPC ......... H01M 8/241; H01M 2008/1095; H01M 2250/20; Y02T 90/32
See application file for complete search history.

(56) References Cited

U.S. PATENT DOCUMENTS

2011/0305969 A1\* 12/2011 Song ................... H01M 8/0204
429/467
2015/0380745 A1\* 12/2015 Bodèn ................... H01M 8/241
429/434

FOREIGN PATENT DOCUMENTS

| WO | WO 2006/062768 A2 | 6/2006 | |
|---|---|---|---|
| WO | WO 2006/065370 A2 | 6/2006 | |
| WO | WO 2010/054744 A1 | 5/2010 | |
| WO | WO-2014001842 A1 \* | 1/2014 | ............ H01M 8/241 |

\* cited by examiner

BIPOLAR PLATE, FUEL CELL HAVING SUCH A PLATE AND MOTOR VEHICLE HAVING SUCH A FUEL CELL

BACKGROUND OF THE INVENTION

Field of the Invention

The invention relates to a bipolar plate for a fuel cell, to a fuel cell having such a bipolar plate and to a motor vehicle which has such a fuel cell.

Fuel cells use the chemical conversion of a fuel with oxygen to water in order to generate electrical energy. For this purpose, fuel cells comprise, as core component, what is termed the membrane electrode assembly (MEA) which is an assembly of an ion-conducting, in particular proton-conducting, membrane, and in each case an electrode (anode and cathode) arranged on either side of the membrane. When the fuel cell is in operation, the fuel, in particular hydrogen $H_2$ or a hydrogen-containing gas mixture, is supplied to the anode, where electrochemical oxidation takes place with release of electrons ($H_2 \rightarrow 2\ H^+ + 2\ e^-$). The membrane, which separates the reaction spaces gas-tightly from one another and electrically insulates same, transports the protons $H^+$ (in a water-bound or water-free manner) from the anode space into the cathode space. The electrons $e^-$ provided at the anode are fed to the cathode via an electric line. The cathode is supplied with oxygen or an oxygen-containing gas mixture, and therefore a reduction of the oxygen takes place with the electrons being absorbed ($\frac{1}{2}\ O_2 + 2\ e^- \rightarrow O^{2-}$). At the same time, said oxygen anions react in the cathode space with the protons transported via the membrane, with water being formed ($2\ H^+ + O^{2-} \rightarrow H_2O$).

Generally, the fuel cell is formed by a multiplicity of stacked membrane electrode assemblies, the electrical power of which adds up. In a stack of fuel cells, a respective bipolar plate is arranged between two membrane electrode assemblies, said bipolar plate serving firstly for supplying the process gases to the anode or cathode of the adjacent membrane electrode assemblies and also for discharging heat. In addition, bipolar plates are composed of an electrically conductive material in order to produce the electrical connection. They therefore have the triple function of supplying process gas to the membrane electrode assemblies, of cooling and of electrical connection.

Variously constructed bipolar plates are known. Fundamental aims in the design of bipolar plates are reduction in weight, reduction in construction space, reduction in costs and increase of the power density. These criteria are important in particular for the mobile use of fuel cells, for example for the electromotive traction of vehicles.

Description of Related Art

Bipolar plates for fuel cells have a customarily centrally arranged active region which is connected to the catalytic electrodes of the membrane electrode assembly and at which the actual fuel cell reactions take place. For this purpose the active region has an open anode gas flow field on the anode side and an open cathode gas flow field on the cathode side. The anode gas flow fields and cathode gas flow fields are generally designed in the form of groove-like channels. However, open-pored/porous structures are also known (US 2011/0039190 A1). In addition, the active region has a closed coolant flow field, wherein the latter is customarily designed in the form of enclosed channels.

In order to supply the active region with the corresponding operating materials, bipolar plates also have through openings for operating materials, namely in each case two anode gas main channels for supplying and discharging the anode gas, two cathode gas main channels for supplying and discharging the cathode gas, and two coolant main channels for supplying and discharging the coolant. In the stack of fuel cells, said through openings for operating materials lie congruently on one another, and therefore they form main supply channels, which pass through the entire stack, for the corresponding operating materials. Customary bipolar plates furthermore have inactive supply regions which serve substantially for the connection between the through openings for operating materials and the corresponding flow fields of the active region. The supply regions here each comprise anode gas channels which are connected in a fluid-conducting manner firstly to the anode gas main channel and secondly to the anode gas flow field of the active region. The inactive supply regions furthermore have cathode gas channels which are connected in a fluid-conducting manner firstly to the cathode gas main channel and secondly to the cathode gas flow field of the active region. Furthermore, the inactive supply region comprises coolant channels which are connected in a fluid-conducting manner firstly to the coolant main channel and secondly to the coolant flow field.

Examples of a bipolar plate according to the above description are disclosed in US 2006/0127706 A1 and DE 102007 008 214 A1. The through openings for operating materials are arranged here in each case on the two mutually opposite narrow sides of the bipolar plates, wherein the coolant main channel is in each case positioned substantially between the anode gas main channel and the cathode gas main channel.

A disadvantage of the known bipolar plates is that very different operating pressures prevail within the anode gas channels and particularly within the anode flux field of the active region. In particular, corner and edge regions of the active surface of the bipolar plate are frequently undersupplied. This problem of the different supply of anode gas to the active surface is particularly apparent in the case of flux fields having interrupted channels, in which the individual anode channels are connected laterally to one another. The high pressure differences cause significant transverse flows within the anode gas flux field and particularly great inhomogeneity here.

A further problem of the known bipolar plates is product water which arises on the cathode side, diffuses through the polymer electrolyte membrane and therefore passes onto the anode side. The water in the anode gas flow field and in the anode gas channels of the supply regions freezes there at low temperatures after the fuel cell has been switched off. This may cause clogging of the channel structures which cannot be freed by the comparatively low operating pressure of the anode gas. If such a bipolar plate is used in a fuel cell of a motor vehicle, after a frost start the water therefore has to be first of all thawed by the coolant. The operating readiness of the fuel cell is thereby delayed.

US 2007/0202383 A1 discloses confronting the problem of non-uniform distribution of anode gas by the anode gas channels of the active region of the bipolar plate branching into a different number of channels.

BRIEF SUMMARY OF THE INVENTION

The invention is then based on the object of providing a bipolar plate for fuel cells, which homogenizes the supply of anode gas in the active region of the bipolar plate and is rapidly ready for operation after a cold start.

The object is achieved by a bipolar plate, a fuel cell having such a plate and a motor vehicle having such a fuel cell with the features of the independent claims.

The bipolar plate according to the invention for a fuel cell comprises an anode side and a cathode side. The bipolar plate here has the following with respect to a top view of the anode side or the cathode side:

- an active region which forms an open gas flow field on the anode side and an open cathode gas flow field on the cathode side, and has a closed coolant flow field,
- through openings for operating materials, at least comprising two anode gas main channels for supplying and discharging the anode gas, two cathode gas main channels for supplying and discharging the cathode gas, and two coolant main channels for supplying and discharging the coolant,
- two inactive supply regions, comprising anode gas channels which are each connected in a fluid-conducting manner to one of the anode gas main channels and to the anode gas flow field of the active region; cathode gas channels which are each connected in a fluid-conducting manner to one of the cathode gas main channels and to the cathode gas flow field of the active region; and coolant channels which are each connected in a fluid-conducting manner to one of the coolant main channels and to the coolant flow field of the active region.

According to the invention, it is now provided that at least one of the anode gas main channels is arranged in such a manner and the anode gas channels of the supply region that are connected to said anode gas main channel are designed in such a manner that a difference in length between a longest anode gas channel and a shortest anode gas channel of the anode gas channels of said supply region is at most 50%, in particular at most 40% and preferably at most 35% based on the length of the longest anode gas channel. Preferably, both anode gas main channels are arranged in this manner, and the anode gas channels of both supply regions are designed in this manner.

It has mainly turned out that the very different channel lengths of the anode gas channels of the supply regions constitute the cause of the inhomogeneous distribution of the anode gas in the active region of the fuel cell. Given suitable positioning of the anode gas main channel or of the anode gas main channels and given a suitable design of the route of the anode gas channels of the supply region, it is possible to substantially equalize the lengths of the anode gas channels of the supply region to one another and therefore to substantially minimize pressure differences within the anode gas channel structures. In this manner, a very uniform action upon the active region of the fuel cell with the anode gas is achieved.

Within the context of the present invention, the term "active region" is understood as meaning that region of the bipolar plate which, in the fitted stack of fuel cells, faces the catalytic electrodes of the membrane electrode assembly, i.e. that region at which a chemical reaction takes place when the fuel cell is in operation. In a delimitation therefrom, "inactive region" denotes a region at which a chemical reaction does not take place. The "inactive region" comprises the inactive supply regions, the through openings for operating materials, and edge regions of the bipolar plate. It goes without saying that the bipolar plate is not chemically active within the narrower sense in any of the regions.

A particularly simple possibility for achieving such an equalization of the channel lengths of the anode gas channels resides in arranging the anode gas main channel substantially between one of the cathode gas main channels and one of the coolant main channels. The two anode gas main channels are preferably each arranged between a cathode gas main channel and a coolant main channel. A respective main channel for the anode gas, the cathode gas and the coolant is preferably arranged here substantially along one side of the bipolar plate, in particular a narrow side of the bipolar plate. The cathode gas main channel and the coolant main channel are each positioned here in the corners of the bipolar plate. By contrast, in the prior art, for example according to US 2006/0127706 A1, the anode gas main channels are in each case arranged laterally while the coolant main channels are arranged between the anode gas main channel and cathode gas main channel. The lateral arrangement of the anode gas main channel leads to the requirement of arranging the corresponding anode gas channels of the inactive supply region obliquely with respect to the main flow direction of the active region. This gives rise to large differences with respect to the channel lengths of the anode gas channels, which channel lengths are equalized with one another by the substantially central arrangement of the anode gas main channel.

According to a further advantageous refinement of the invention, a route of the anode gas channels of the supply region has at least one change of direction (deflection) within the supply region. In this context, it is preferably provided for a first flow direction of the anode gas channels running substantially parallel to one another to point in the direction of a first side of the bipolar plate, in particular a longitudinal side of same, and for a second flow direction to point in the direction of a second side of the bipolar plate, which side lies opposite the first side. In other words, the anode gas channels cross a fictitious main flow direction of the active region of the bipolar plate first of all in one direction and then in the other direction. By means of this zigzag route, the channel lengths are also equalized with one another.

A preferred development of the present bipolar plate according to the invention relates to the route of the coolant channels of the supply regions. According thereto, the coolant channels and the anode gas channels of at least one of the two supply regions substantially run over a congruent portion of the bipolar plate. In this manner, the anode gas channels are well connected thermally virtually over the entire length thereof to the coolant channels. If water freezes in the anode gas channels, said water can be thawed by the coolant which can be heated during a cold start. A fuel cell which is equipped with bipolar plates according to the invention is therefore more rapidly ready for operation after a cold start.

It is furthermore preferably provided that the coolant channels of at least one of the two supply regions run in a first portion, which is connected to the coolant main channel, substantially on the cathode side of the bipolar plate. In an adjoining second portion, the coolant channels run substantially on the anode side. Between the first and second portion, the coolant channels are transferred at a transfer point from the cathode side onto the anode side. Particularly preferably, the first portion, at which the coolant channels are formed on the cathode side, is substantially congruent with that portion on the anode side in which the anode gas channels of the supply region run in the first flow direction. By means of this overlapping arrangement of the coolant channels of the first portion on the cathode side and of the anode gas channels on the anode side of the bipolar plate, first of all good surface use of the bipolar plate surface available for the arrangement of the various elements is achieved. By this means, the overall surface can be reduced and therefore the fuel cell volume reduced. Furthermore, by means of the abovementioned configuration, good thermal connection of the anode gas channels to the coolant is achieved, in particular in the region of the transition from the anode gas main channel and the anode gas channels, which are connected thereto, of the supply region.

It is furthermore preferably provided that the closed coolant channels run parallel and in each case between two anode gas channels in the second portion, in which the coolant channels run within the supply region on the anode side. By means of this measure, both the surface use of the bipolar plate and the thermal connection between anode gas channels and coolant channels is further improved.

In a preferred embodiment, the bipolar plate has at least two profiled plates which are joined to one another, namely a plate on the anode side and a plate on the cathode side. In this case, the anode gas channels and cathode gas channels of the inactive supply portions are formed by corresponding grooves in the plates or by corresponding rampart-like elevations (webs). The closed coolant channels are formed here between the two plates. Such a construction of the bipolar plate permits virtually any profile designs of the channel structures in the inactive supply regions and in the active region of the bipolar plates, for example by stamping, deep drawing or punching the plates.

The anode gas flow field and the cathode gas flow field of the active region of the bipolar plate are preferably designed in the form of flow channels which run rectilinearly or in a meandering manner and are realized as grooves impressed into the respective plate. The flow channels can be particularly advantageously formed here as interrupted channels which therefore permit a transfer between two adjacent flow channels. A particularly homogeneous distribution of the anode gas or cathode gas over the active surface is thereby achieved.

According to a further refinement of the invention, a clear area of the two anode gas main channels is smaller than a clear area of the two cathode gas main channels. This refinement takes account of the fact that an anode gas mass flow in fuel cells is generally selected to be smaller than a cathode gas mass flow.

A further aspect of the present invention relates to a fuel cell which has at least two bipolar plates according to the invention, customarily a plurality of bipolar plates, and a respective membrane electrode assembly arranged between two bipolar plates.

Furthermore, an aspect of the invention relates to a motor vehicle which has such a fuel cell, in particular as an energy supply source for an electromotive drive.

The invention is explained below in exemplary embodiments with reference to the associated drawings, in which:

DETAILED DESCRIPTION OF THE INVENTION

The basic design of a fuel cell will first of all be explained with reference to FIG. 1.

Figure 1:
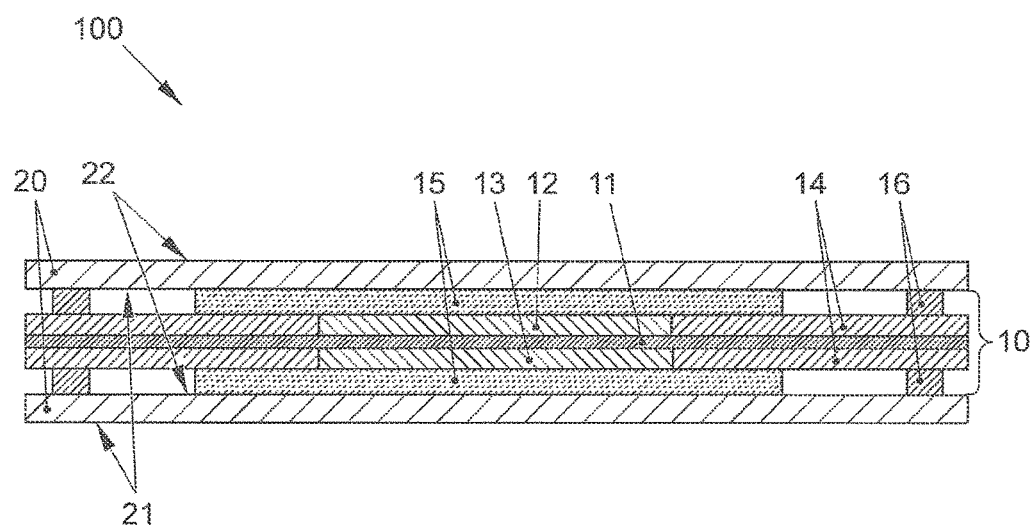
FIG. 1 shows a schematic sectional view of a fuel cell (individual cell)

FIG. 1 shows a highly schematized sectional view through a fuel cell which is denoted here overall by 100 and of which only an individual cell is illustrated here.

The fuel cell 100 comprises a membrane electrode assembly (MEA) 10. The MEA 10 has an ionically conductive, in particular proton-conducting polymer electrolyte membrane (PEM) 11. The PEM 11 is contacted in a sheet like manner by two catalytic electrodes, namely an anode 12 and a cathode 13. The electrodes 12, 13 are customarily an electrically conductive support material, for example on the basis of carbon, on which a catalytic material is present supported in the fine distribution. The region on which the electrodes 12, 13 are present and on which, consequently, the fuel cell reactions take place is referred to as active region. In an active, lateral region, there are customarily no electrodes; instead, the membrane 11 is mechanically supported there by support layers 14. A respective gas diffusion layer (GDL) 15 adjoins the outer surfaces of the electrodes 12, 13. The GDLs 15 are composed of a porous, electrically conductive material and serve for the uniform distribution of the anode and cathode operating gases. The electrodes 12, 13 can be present as a coating on the PEM 11 or the GDLs 15. The cell is sealed laterally via peripheral seals 16 which are arranged on the support layers 14.

The membrane electrode assembly 10 is arranged between two bipolar plates 20. Each bipolar plate 20 has an anode side 21 and a cathode side 22. On the anode side 21, an open anode gas flux field, for example in the form of open channels (not shown in this illustration), is arranged in the active region of the bipolar plate 20. In the same manner, a cathode gas flux field which, in turn, can be designed in the form of open channels (not illustrated) is present in the same manner on the cathode side 22 of the bipolar plates 20. Furthermore, the bipolar plates 20 have a closed coolant flux field (likewise not illustrated) which serves for cooling the fuel cell. The individual channel structures of the bipolar plates 20 are not illustrated in FIG. 1, but are explained in more detail with reference to the following figures.

A fuel cell customarily has a stack of a multiplicity of membrane electrode assemblies 10 and bipolar plates 20 which are stacked in an alternating manner and the electrical power of which adds up.

The fuel cell 100 of FIG. 1 has the following function:

An anode gas—here hydrogen $H_2$—is fed via the anode gas flux field to the anode sides 21 of the bipolar plates 20 and is supplied to the anode 12 via the gas diffusion layer 15. The hydrogen reacts on the catalytic material of the anode 12 to form protons $H^+$, with electrons being released, the electrons being supplied to the cathode 13 via an external current circuit. The protons produced at the anode 12 diffuse via the proton-conducting polymer electrolyte membrane and pass to the cathode 13. At the same time, a cathode gas—air here—is fed in via the cathode gas flux field to the cathode sides 22 of the bipolar plates 20 and is supplied to the cathode 13 via the gas diffusion layer 15. At the cathode 13, the air oxygen $O_2$ is reduced to oxygen anions $O^{2-}$ which react with the protons provided via the PEM 11, with electrons being absorbed, to form water $H_2O$. An electrical current is thereby generated in the current circuit.

Figure 2A:
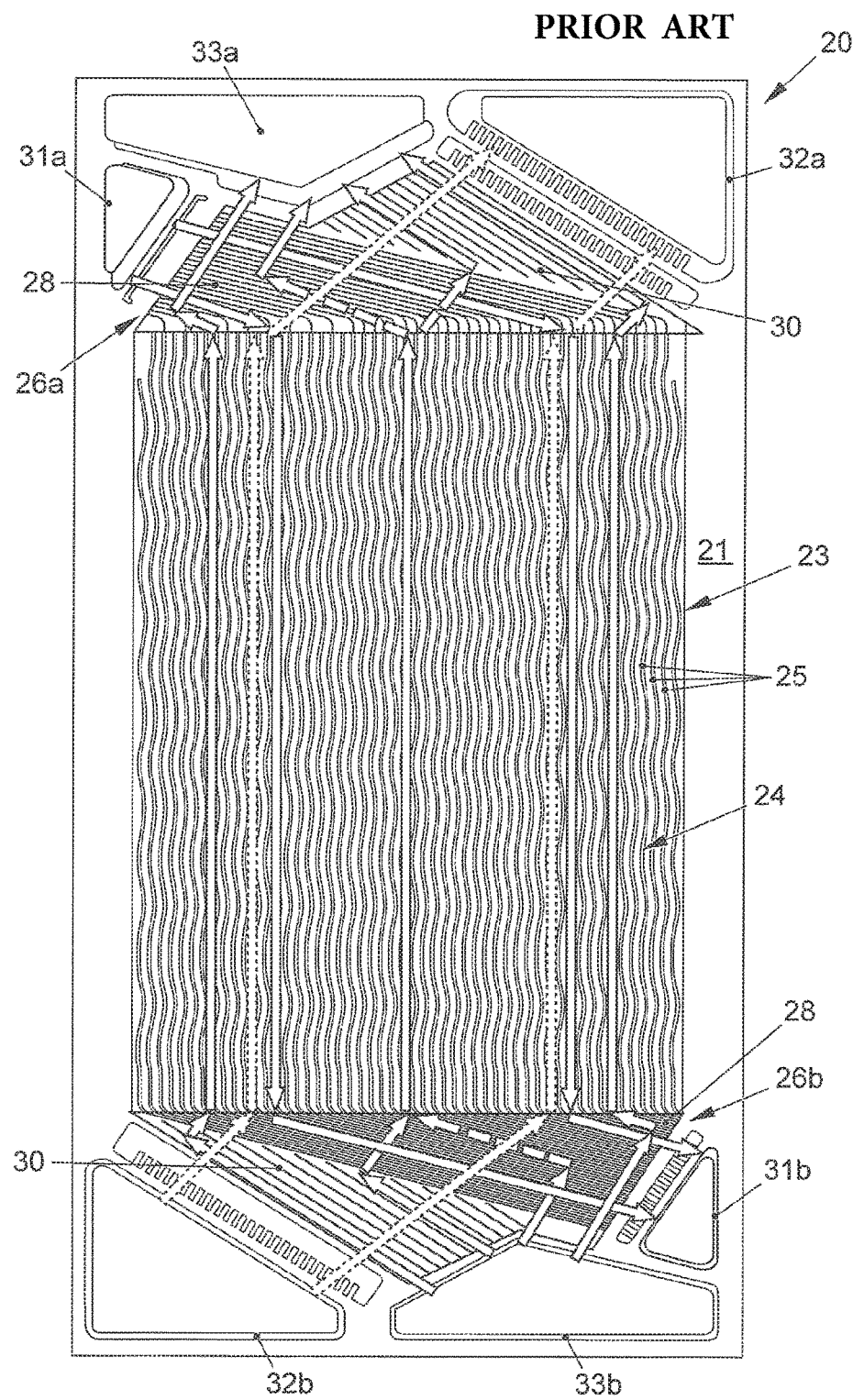
FIGS. 2A and 2B show a plan view of an anode side of a bipolar plate according to the prior art (A: overall view, B: partial view)
Figure 2B:
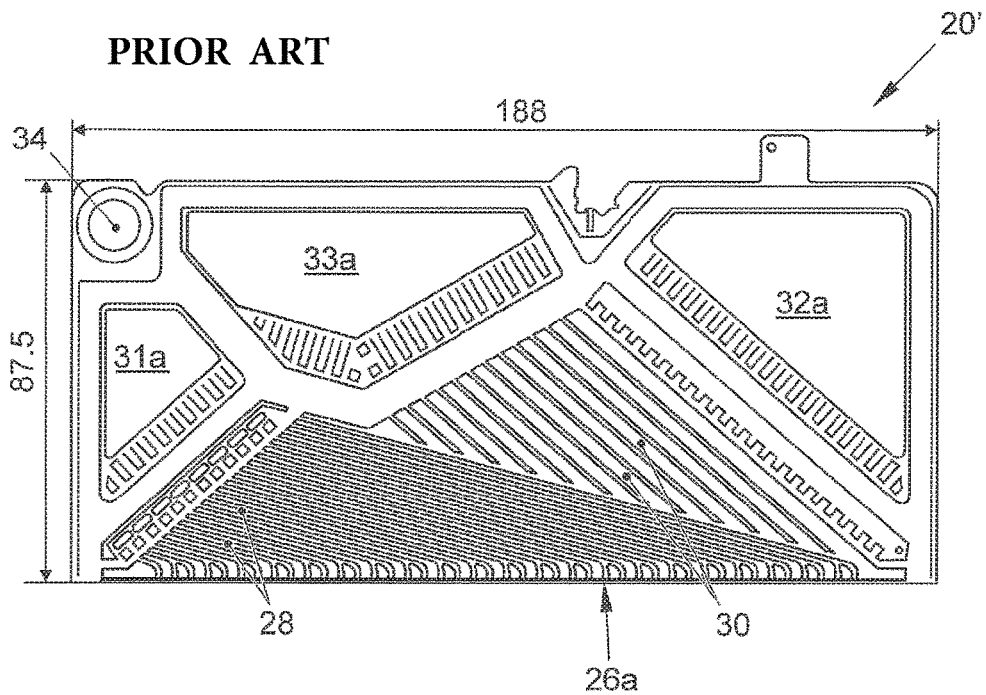

FIG. 2A shows a bipolar plate 20' according to the prior art according to US 2006/0127706 A1. The bipolar plate 20' is illustrated here in plan view of the anode side 21 thereof. FIG. 2B shows a more detailed example of the upper, inactive region of the bipolar plate 20' in FIG. 2A. The bipolar plate 20' has a central active region 23 in which an anode gas flow field 24, which is open on the anode side, is formed, here in the form of open channels 24 running in a meandering manner. At the same time, an open cathode gas flux field with corresponding channels is formed on the cathode side (not visible). In addition, in the active region 23 there is a closed coolant flux field in the form of internal, i.e. closed, coolant channels which are likewise not visible in the present case.

The bipolar plate 20' furthermore has two inactive supply regions 26A and 26B. The supply regions 26A, 26B each have open anode gas channels 28 which are connected in a fluid-conducting manner to the channels of the anode gas flow field 24. The anode gas channels 28 run directly and rectilinearly in a direction which is oblique with respect to the main flow direction of the active region 23. Furthermore, the inactive supply regions 26a and 26b on the cathode side (not visible here) of the bipolar plate 20' have open cathode gas channels which are connected in a fluid-conducting manner to the cathode flow field (likewise not visible) of the active region 23. In a similar manner to the anode gas channels 28, the cathode gas channels of the supply regions 26a, 26b also run rectilinearly and in a direction oblique with respect to the main flow direction of the active region 23. Finally, the inactive supply regions 26a and 26b have closed coolant channels 30 (visible here as rampart-like elevations) which are connected in a fluid-conducting manner to the coolant flow field of the active region 23.

The bipolar plate 20' furthermore has a total of six through openings for operating materials. Said through openings comprise two anode gas main channels 31a, 31b, two cathode gas main channels 32a, 32b and two coolant main channels 33a and 33b. Of said openings, one opening serves in each case to supply the respective operating material and the other opening to discharge same. The open anode gas channels 28 of the inactive supply region 26a connect the anode main gas channel 31a to the open channels 25 of the anode gas flow field 24 of the active region 23. On the other side, the open anode gas channels 28 of the inactive supply region 26b connect the anode main gas channel 31b to the other side of the anode gas flow field 24 of the active region 23. In the same manner, the open cathode gas channels (not visible here) of the supply region 26a connect the cathode gas main channel 32a to the cathode gas flow field of the active region 23, and the cathode gas channels of the supply region 26b connect the cathode gas main channel 32b to the cathode gas flow field. Finally, the closed coolant channels 30 of the inactive supply region 26a connect the coolant main channel 33a to the closed coolant flow field (not visible) of the active region 23 and the coolant channels 30 of the supply region 26b connect the coolant main channel 33b to the other end of the coolant flow field of the active region 23. The bipolar plate 20' furthermore has a centering opening 34 which serves to align the bipolar plates during assembly of the stack of fuel cells.

The anode gas channels 28 and the cathode gas channels of the supply regions 26a and 26b are in each case designed here as (outwardly) open grooves. In the assembled state of the stack of fuel cells, said channels are customarily concealed and closed by the support layer 14 of the membrane electrode assembly 10 (see FIG. 1). Alternatively, however, the anode and cathode gas channels of the supply regions 26a and 26b may also be designed to already be closed in the non-fitted bipolar plate.

As can best be seen in FIG. 2B, the open anode gas channels 28 of the inactive supply region 26a have a considerable difference in length between the longest and the shortest anode gas channel 28 of the supply region 26a. In the example illustrated, the channel length of the shortest channel (on the extreme left in the illustration) is approx. 5 mm and the channel length of the longest anode gas channel (on the right in the illustration) is approx. 150 mm. This corresponds to a difference in length of approximately 97% based on the longest anode gas channel 28. This large difference in length leads to a considerable difference in the pressure drop between the shortest and the longest anode gas channel 28. By this means, a non-uniform supply of operating materials to the channels 25 of the anode gas flow field 24 of the active region 23 occurs. In particular if the channels of the anode gas flow field 24 are formed in an interrupted manner, i.e. are connected to one another via lateral openings, undesirably powerful transverse flows occur between the channels 25 and an undersupply of anode gas in corner and edge regions of the anode gas flow field 24 occurs.

In principle, the problem of unequal channel lengths also exists for the cathode channels of the supply regions 26a, 26b. However, this is very substantially noncritical since the cathode operating gas (air) is supplied with a high stoichiometric excess and a high operating pressure.

A further problem of the bipolar plates 20' according to the prior art and illustrated in FIG. 2 is the appearance of product water in the anode gas channels of the inactive supply regions 26a, 26b. If said water freezes in the channel structures after the fuel cell has been switched off, the fuel cell is only operationally ready again if said water is thawed.

Figure 3:
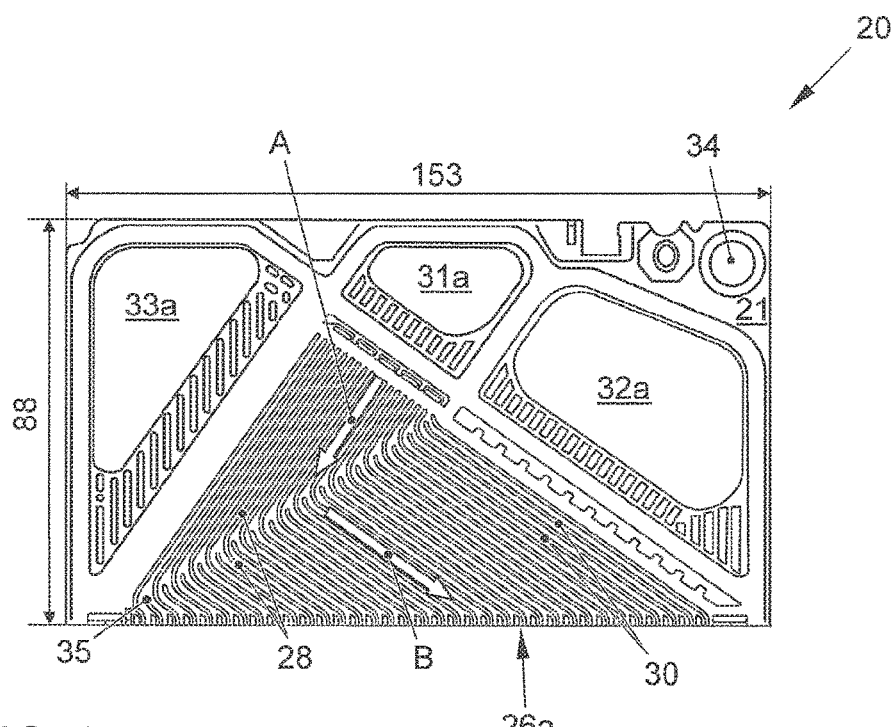
FIG. 3 shows a partial view of the anode side of a bipolar plate according to the present invention.

These problems are solved by a bipolar plate 20 according to the invention which is illustrated in the form of a preferred refinement in FIG. 3. In this case, in a similar manner to the illustration according to FIG. 2B, only the anode side 21 of the upper inactive region 26a of the bipolar plate 20 is shown. Identical elements are denoted with the same reference signs. Furthermore, unless mentioned otherwise, the same elements have the same functions and constructions as in FIG. 2.

The bipolar plate 20 according to the invention according to FIG. 3 has an arrangement of the through openings 31, 32 and 33 for the operating materials that differs from the known bipolar plate 20' (cf. FIG. 2B). In particular, the anode gas main channel 31a is arranged here substantially between the cathode main gas channel 32a and the coolant main channel 33a, i.e. the cathode gas main channel 32a and the coolant main channel 33a are arranged substantially in corner regions, in particular of the short sides, of the bipolar plate 20. Furthermore, the route of the anode gas channels 28 of the supply region 26a has a change of direction (deflection) within the supply region 26a. A first flow direction A of the anode gas channels 28 in the region of the supply region 26a points here in the direction of a first side of the bipolar plate 20, in particular the longitudinal side (illustrated here on the left) of the plate. The flow channels 28 are then deflected, here, for example, by an angle of 90°, such that said flow channels have a second flow direction B. The second flow direction B points in the direction of a second side lying opposite the first side of the bipolar plate 20, i.e. in the direction here of the right longitudinal side of the plate 20. The effect achieved by this selection of the routes of the anode gas channels 28 is that the difference in length between the longest anode gas channel (on the left in FIG. 3) and the shortest anode gas channel (on the right in FIG. 3) is significantly reduced in comparison to the prior art. In the present example, the length of the longest anode gas channel is 115 mm and that of the shortest is 80 mm. This corresponds a difference in length of circa 30% based on the longest anode gas channel 28. By means of said equalization of the channel lengths of the cathode gas channels in the supply region 26a, a homogenization of the distribution of the anode gas in the channels 28 of the supply region 26a and the channels 25 of the active region 23 is achieved. The arrangement and design of the through openings 31b, 32b and 33b for operating materials and of the anode gas channels 28 of the second inactive supply region 26b are preferably designed in the same manner as in the region 26a.

The bipolar plate 20 according to the invention is furthermore distinguished by the design of the coolant channels 30 in the supply regions 26a, 26b. As will also be seen with reference to FIGS. 6 to 8, in particular 7, discussed later on, the closed coolant channels 30 of the supply regions 26a and 26b run in a first portion, which is connected to the corresponding coolant main channel 33a, 33b, substantially on the cathode side 22. In the illustration of the anode side according to FIG. 3, this means that the coolant channels 30 which are connected to the coolant main channel 33a are arranged on the rear side and first of all run underneath the anode gas channels 28 in a direction obliquely with respect to the longitudinal direction of the plate, similarly to the direction B. The region to which the coolant channels 30 of the supply region 26a, 26b run on the cathode side 22 of the bipolar plate 20 substantially correspond to that region of the supply region 26a, 26b in which the anode gas channels 28 run in the first direction A.

Then, at a transfer point 35, which substantially corresponds to the location of the change of direction of the anode gas channels 28, the route of the coolant channels 30 on the cathode side ends and is continued with an overlap on the anode side 21. From the transfer point 35, the coolant channels 30 of the supply regions 26a, 26b therefore run on the anode side 21 of the bipolar plate 20. As is apparent in FIG. 3, the route of the coolant channels 30 on the anode side 21 of the plate 20 corresponds to that of the anode gas channels 28, i.e. the coolant channels 30 are guided in this region parallel to the anode gas channels 28. In this region, the coolant channels therefore likewise have the second flow direction B of the anode gas channels 28. In addition, the coolant channels 30 are arranged in said second portion in such a manner that they run in each case between two anode gas channels 28.

The effect achieved by this configuration of the routes of the coolant channels 30 is that the latter run in the supply regions 26a, 26b substantially in a congruent portion of the bipolar plate 20 with the anode gas channels 28. By this means, a good thermal connection of the anode gas channels 28 to the coolant channels 30 of the supply regions 26a, 26b is achieved. In particular, the anode gas channels 28, even at the beginning of the entry thereof from the anode gas main channel 31a, 31b, are thermally coupled three-dimensionally to the coolant. If frozen water therefore occurs at this point in the channels 28, rapid thawing of the water during a cold start of the fuel cell is achieved by the warmer or heated coolant. The fuel cell is thus more rapidly operationally ready after a cold start. If frozen water is also present on the other side in the cathode gas channels 29 of the supply regions 26a, 26b, said water is in any case rapidly heated and thawed because of the cathode gas (air) heated by the high compression.

Figure 4:
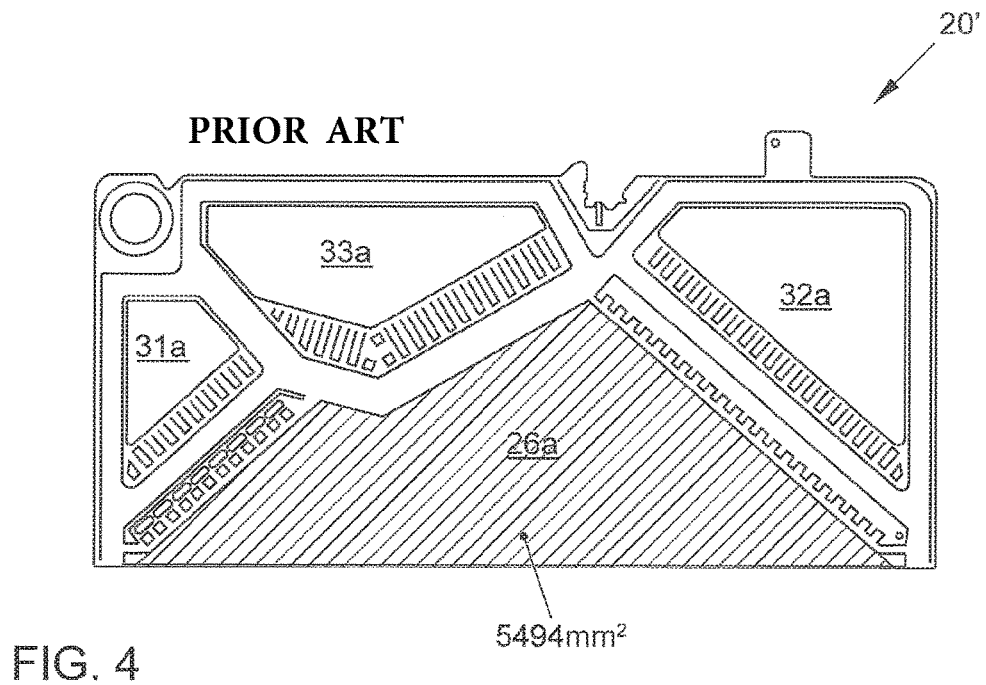
FIG. 4 shows a partial view of the anode side of a bipolar plate according to the prior art according to FIG. 2A with the inactive supply region emphasized.
Figure 5:
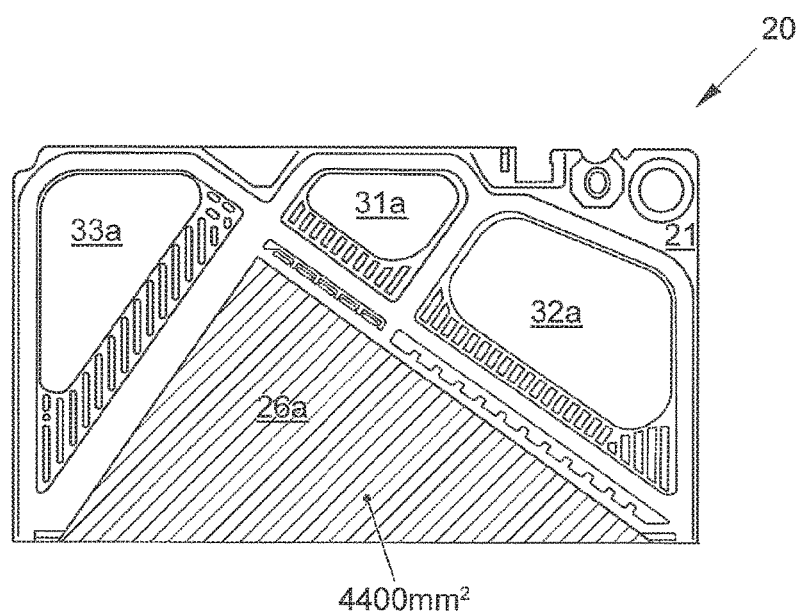
FIG. 5 shows a partial view of the anode side of a bipolar plate according to the present invention according to FIG. 3 with the inactive supply region emphasized.

The bipolar plate 20 according to the invention also leads to a smaller dimensioning of the plate since the plate surfaces which are present are used optimally for accommodating the anode gas channels 28, cathode gas channels 29 and coolant channels 30 of the supply regions 26a and 26b. While, in the case of the bipolar plate according to FIG. 2B, part of the surface of the supply regions 26a and 26b is always used only on one side for the anode gas and cathode gas channels 28, 29, the available surface of the inactive supply region 26a, 26b on either side of the plate 20 is used for the various channels 28, 29 and 30 of the operating materials. This state of affairs is visualized in FIGS. 4 and 5 which respectively illustrate the bipolar plate 20' according to the prior art and the bipolar plate 20 according to the present invention, with the inactive supply region 26a being respectively emphasized (left grey). Accordingly, the surface of the inactive supply region 26a of the bipolar plate 20 according to the invention is circa 4400 mm$^2$ (FIG. 5) while the surface of the inactive region 26a of the conventional bipolar plate 20' takes up 5494 mm$^2$ (FIG. 4). The clear diameters of the main channels 31a, 32a and 33a for operating materials are unchanged here. The reduction in the inactive supply region 26a, 26b permits a significant reduction in the dimensions of the bipolar plate 20. This not only significantly reduces the required construction space for the fuel cell, but also the weight thereof.

Figure 6:
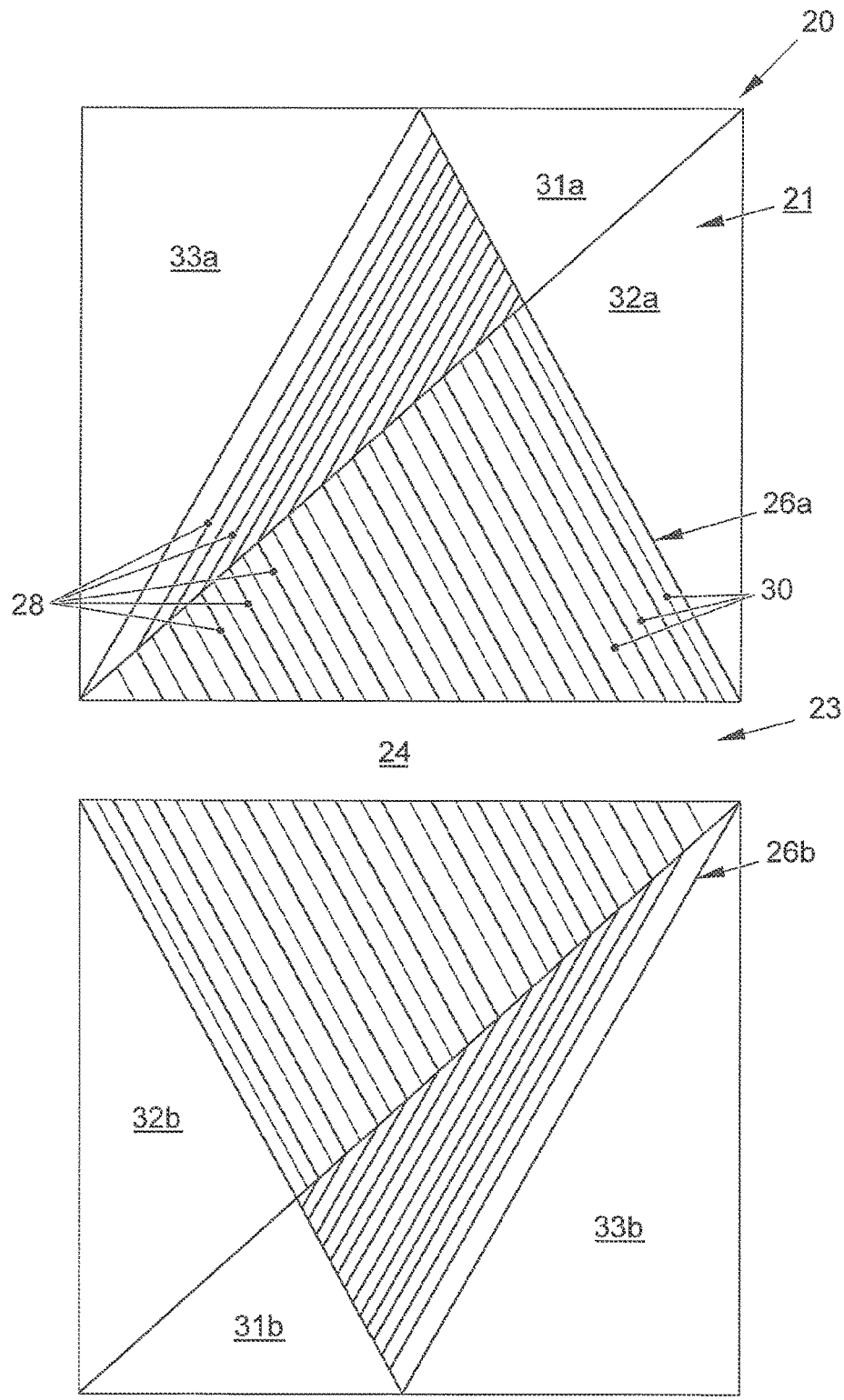
FIG. 6 shows an idealized plan view of the anode side of a bipolar plate according to the present invention (without active region)
Figure 7:
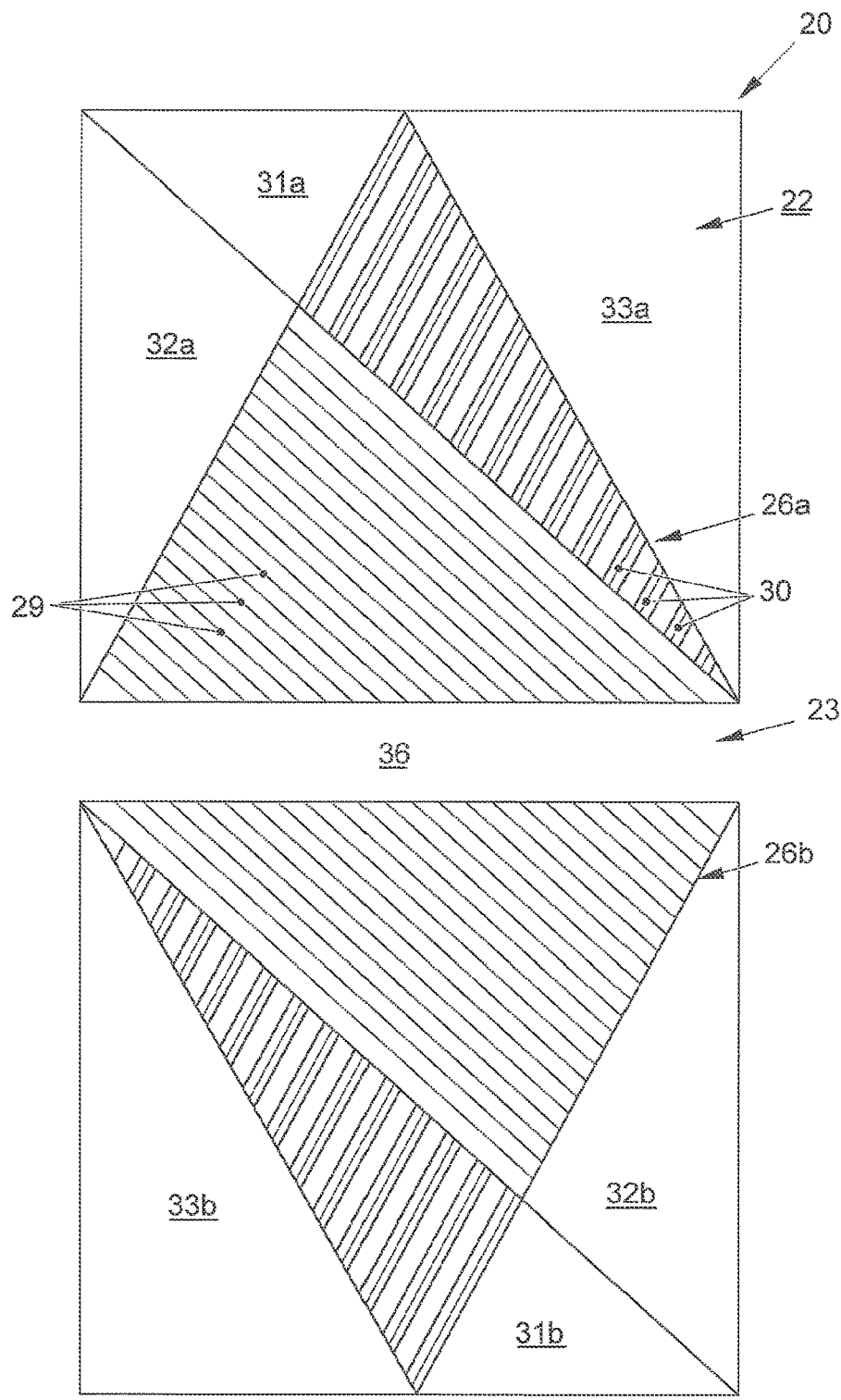
FIG. 7 shows an idealized plan view of the cathode side of a bipolar plate according to the present invention (without active region)
Figure 8:
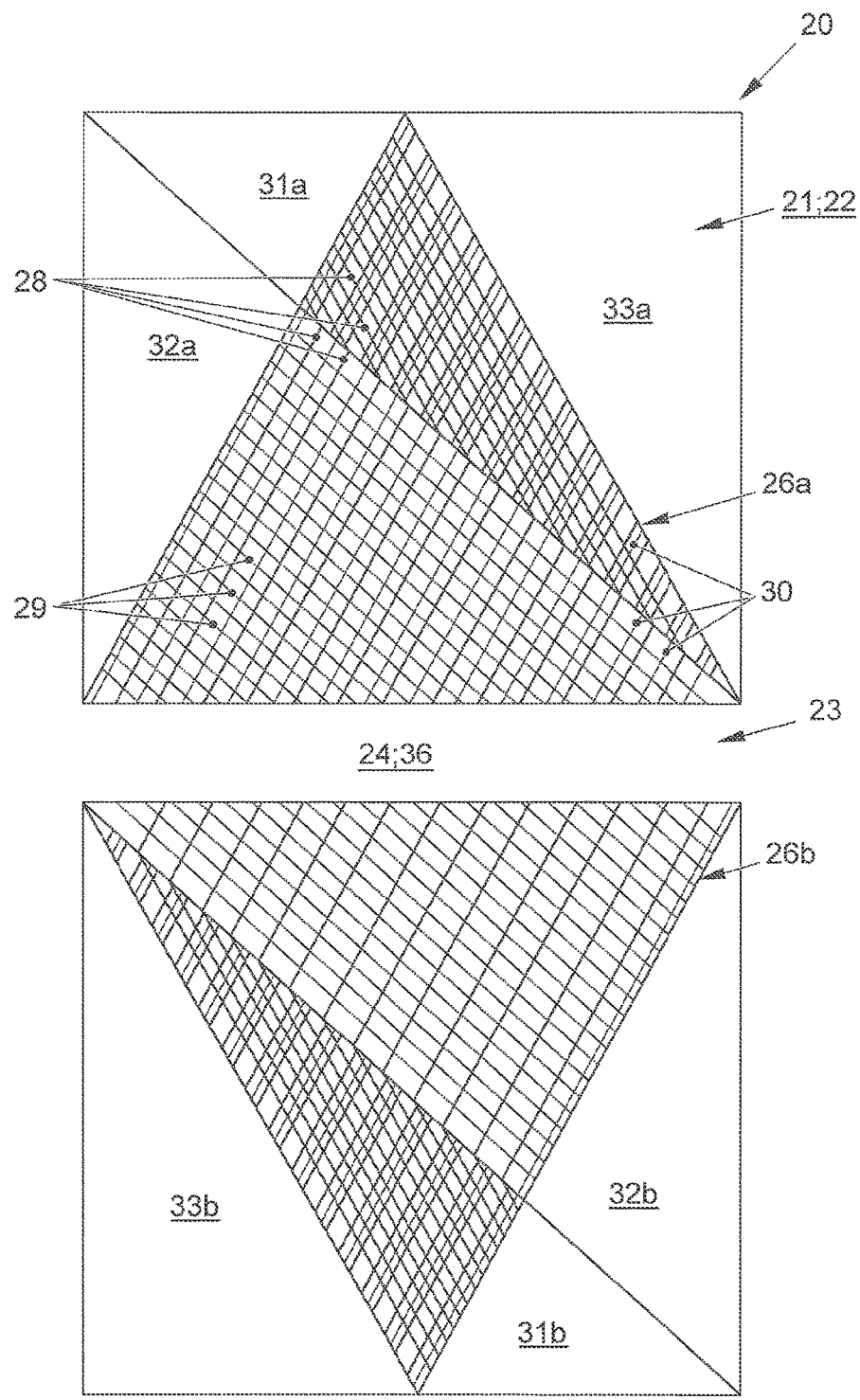
FIG. 8 shows an idealized plan view of the anode side of a bipolar plate according to the present invention with superimposed cathode side according to FIGS. 6 and 7 (without active region).

The principle of the invention becomes particularly clear in the illustration of FIGS. 6 to 8, wherein 6 shows a bipolar plate 20 according to the invention from the anode side 21 thereof and FIG. 7 shows same from the cathode side 22 thereof. FIG. 8 shows a superimposition of the two views, and therefore the anode gas channels 28, the cathode gas channels 29 and the coolant channels 30 of the inactive supply regions 26a and 26b are visible irrespective of the actual visibility thereof. Only the inactive regions of the bipolar plate 20 are illustrated in each case, while the active region 23 with the anode gas flow field 24 or the cathode gas flow field 36 is not explained further.

It is clear from FIG. 7, which shows the cathode side 22 of the bipolar plate 20, that the cathode gas channels 29 of the inactive supply regions 26a and 26b have a rectilinear route between the cathode gas main channels 32a, 32b and the cathode gas flow field 36 of the active region 23. They therefore substantially correspond to the route of conventional bipolar plates.

The optimum surface use of the inactive supply regions 26a, 26b is shown particularly clearly in FIG. 8. In particular, this illustration shows that the coolant channels 30, which are connected to the coolant main channels 33a and 33b, and the anode gas channels 28, which are connected to the anode gas main channels 31a or 31b, take up a substantially congruent region of the bipolar plate 20, wherein said region substantially corresponds to the region of the inactive supply regions 26a and 26b.

LIST OF REFERENCE SIGNS

100 Fuel cell
10 Membrane electrode assembly

11 Polymer electrolyte membrane
12 Electrode/anode
13 Electrode/cathode
14 Support layer
15 Gas diffusion layer
16 Seal
20 Bipolar plate
21 Anode side
22 Cathode side
23 Active region
24 Anode gas flux field
25 Channels
26a, 26b Inactive supply region
28 Anode gas channel
29 Cathode gas channel
30 Coolant channel
31a, 31b Anode gas main channel
32a, 32b Cathode gas main channel
33a, 33b Coolant main channel
34 Centering opening
35 Change of direction (deflection)
36 Cathode gas flow field

The invention claimed is:

1. A bipolar plate for a fuel cell, comprising an anode side and a cathode side, wherein the bipolar plate has with respect to a top view of the anode or cathode side:
   an active region which forms an open anode gas flow field on the anode side and an open cathode gas flow field on the cathode side, and has a closed coolant flow field,
   through openings for operating materials, at least comprising two anode gas main channels for supplying and discharging the anode gas, two cathode gas main channels for supplying and discharging the cathode gas, and two coolant main channels for supplying and discharging the coolant,
   two inactive supply regions, comprising anode gas channels which are each connected in a fluid-conducting manner to one of the anode gas main channels and to the anode gas flow field of the active region; cathode gas channels which are each connected in a fluid-conducting manner to one of the cathode gas main channels and to the cathode gas flow field of the active region; and coolant channels which are each connected in a fluid-conducting manner to one of the coolant main channels and to the coolant flow field of the active region,
   wherein at least one of the two anode gas main channels and routes of the anode gas channels of the inactive supply region that are connected to said anode gas main channel are arranged so that a difference in length between a longest and a shortest anode gas channel of the anode gas channels of said inactive supply region is at most 50% of the length of the longest anode gas channel,
   wherein the coolant channels of at least one of the two inactive supply regions run in a first portion, which is connected to one of the coolant main channels on the cathode side, and are then transferred at a transfer point onto the anode side, and run in a second portion on the anode side,
   wherein, in the second portion, the coolant channels run parallel to and in a same direction as the anode gas channels, with each of the coolant channels running in between two adjacent anode gas channels, respectively, and
   wherein the first portion of the coolant channels extends in a single direction from the one of the coolant main channels on the cathode side to the transfer point, the single direction being opposite to a run direction of the cathode gas channels in the at least one of the two inactive supply regions of the cathode side.

2. The bipolar plate as claimed in claim 1, wherein both of the two anode gas main channels and the routes of the anode gas channels of the two inactive supply regions are arranged so that the difference in length between the longest and the shortest anode gas channel of the inactive supply regions is at most 50% of the length of the longest anode gas channel.

3. The bipolar plate as claimed in claim 1, wherein a route of the anode gas channels of the inactive supply region has at least one change of direction within the inactive supply region, wherein a first flow direction (A) points in the direction of a first side of the bipolar plate and a second flow direction (B) points in the direction of a second side of the bipolar plate, which second side lies opposite the first side.

4. The bipolar plate as claimed in claim 1, wherein the coolant channels and the anode gas channels of at least one of the two inactive supply regions substantially run over a congruent portion of the bipolar plate.

5. The bipolar plate as claimed in claim 1, wherein the bipolar plate has at least two profiled plates which are joined to each other and include a plate on the anode side and a plate on the cathode side, wherein the anode gas channels and cathode gas channels of the inactive supply regions are formed by corresponding grooves in the plates, and the coolant channels are formed between the plates.

6. A fuel cell comprising at least two bipolar plates as claimed in claim 1, and a membrane electrode assembly arranged therebetween.

7. A motor vehicle having a fuel cell as claimed in claim 6.

8. The bipolar plate as claimed in claim 1, wherein both of the two anode gas main channels and the routes of the anode gas channels of the two inactive supply regions are arranged so that the difference in length between the longest and the shortest anode gas channel of the inactive supply regions is at most 40% of the length of the longest anode gas channel.

9. The bipolar plate as claimed in claim 1, wherein, in the first portion, the coolant channels run in a first flow direction (A) that points in the direction of a first side of the bipolar plate, and in the second portion, the coolant channels run in a second flow direction (B) that points in the direction of a second side of the bipolar plate, the second side being opposite to the first side.

10. A bipolar plate for a fuel cell, comprising an anode side and a cathode side, wherein the bipolar plate has with respect to a top view of the anode or cathode side:
   an active region which forms an open anode gas flow field on the anode side and an open cathode gas flow field on the cathode side, and has a closed coolant flow field,
   through openings for operating materials, at least comprising two anode gas main channels for supplying and discharging the anode gas, two cathode gas main channels for supplying and discharging the cathode gas, and two coolant main channels for supplying and discharging the coolant,
   two inactive supply regions, comprising anode gas channels which are each connected in a fluid-conducting manner to one of the anode gas main channels and to the anode gas flow field of the active region; cathode gas channels which are each connected in a fluid-conducting manner to one of the cathode gas main channels and to the cathode gas flow field of the active region; and coolant channels which are each connected in a fluid-conducting manner to one of the coolant main channels and to the coolant flow field of the active region, wherein at least one of the two anode gas main channels and routes of the anode gas channels of the inactive supply region that are connected to said anode gas main channel are arranged so that a difference in length between a longest and a shortest anode gas channel of the anode gas channels of said inactive supply region is at most 50% of the length of the longest anode gas channel, wherein the coolant channels of at least one of the two inactive supply regions run in a first portion, which is connected to one of the coolant main channels on the cathode side, and are then transferred at a transfer point onto the anode side, and run in a second portion on the anode side, wherein, in the second portion, the coolant channels run parallel to and in a same direction as the anode gas channels, with each of the coolant channels running in between two adjacent anode gas channels, respectively, and wherein, in at least one of the two inactive supply regions, the at least one of the two anode gas main channels is substantially arranged between a cathode gas main channel and a coolant main channel, such that the at least one of the two anode gas main channels is located substantially centrally with respect to sides of the bipolar plate.

* * * * *